United States Patent
Haldeman et al.

(10) Patent No.: US 10,126,175 B2
(45) Date of Patent: Nov. 13, 2018

(54) LONG WAVE INFRARED SENSING FOR TURBOMACHINE

(71) Applicant: UNITED TECHNOLOGIES CORPORATION, Farmington, CT (US)

(72) Inventors: Charles W. Haldeman, Simsbury, CT (US); Andrew Consiglio, Southbury, CT (US); Mark F. Zelesky, Bolton, CT (US); Joel H. Wagner, Wethersfield, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 934 days.

(21) Appl. No.: 14/564,774

(22) Filed: Dec. 9, 2014

(65) Prior Publication Data
US 2015/0160097 A1 Jun. 11, 2015

Related U.S. Application Data

(60) Provisional application No. 61/914,815, filed on Dec. 11, 2013.

(51) Int. Cl.
| | |
|---|---|
| *G01J 5/00* | (2006.01) |
| *G01K 1/00* | (2006.01) |
| *F01D 21/00* | (2006.01) |
| *F01D 5/28* | (2006.01) |
| *F01D 21/12* | (2006.01) |

(52) U.S. Cl.
CPC ............ *G01J 5/0088* (2013.01); *F01D 5/284* (2013.01); *F01D 5/288* (2013.01); *F01D 21/003* (2013.01); *F01D 21/12* (2013.01); *G01J 5/0022* (2013.01); *G01J 5/0066* (2013.01); *F05D 2260/80* (2013.01); *G01J 2005/0077* (2013.01)

(58) Field of Classification Search
USPC .............................. 374/121, 141, 208, 124, 4
See application file for complete search history.

(56) References Cited

U.S. PATENT DOCUMENTS

| | | | | |
|---|---|---|---|---|
| 2008/0095212 A1* | 4/2008 | Jonnalagadda | ....... | G01J 5/0003 374/124 |
| 2008/0304126 A1* | 12/2008 | Powell | ...................... | G01J 5/04 359/234 |
| 2009/0312956 A1* | 12/2009 | Zombo | ................... | F01D 5/288 702/34 |
| 2010/0224772 A1* | 9/2010 | Lemieux | .............. | G01D 18/008 250/252.1 |
| 2012/0101769 A1* | 4/2012 | Zombo | ...................... | G01J 5/00 702/135 |
| 2013/0041614 A1* | 2/2013 | Shepard | ................ | G01J 5/0014 702/130 |
| 2014/0033799 A1* | 2/2014 | Newman | .................. | G01B 9/02 73/37 |

* cited by examiner

*Primary Examiner* — Mirellys Jagan
(74) *Attorney, Agent, or Firm* — Cantor Colburn LLP

(57) ABSTRACT

A system includes a turbomachine having one or more inspection ports. An LWIR sensor is positioned in the inspection port of the turbomachine to sense thermal energy emitted by a turbomachine component. An imaging device can be operably connected to the LWIR sensor to convert signals from the LWIR sensor to a thermal image of the turbomachine component based on the sensed thermal energy. In some embodiments, the LWIR sensor configured to image a ceramic coated turbine blade.

15 Claims, 1 Drawing Sheet

LONG WAVE INFRARED SENSING FOR TURBOMACHINE

CROSS-REFERENCE TO RELATED APPLICATION

This application claims the benefit of priority under 35 U.S.C. § 119(e) to U.S. Provisional Application No. 61/914,815, filed Dec. 11, 2013, which is incorporated herein by reference in its entirety.

BACKGROUND

1. Field

The present disclosure relates to turbomachines, and more particularly to turbomachine health determination and diagnostics.

2. Description of Related Art

Traditionally, to determine the health of turbomachine components, a mechanic must visually inspect the elements after the turbomachine is turned off and sufficiently cooled. In the example of turbine blades, a mechanic may insert a boroscope into a boroscope port to visually inspect the turbine blades after they have sufficiently cooled down. However, this leaves the mechanic only with a view of the health of the blades after cooling, not actual health during hot operation.

Such conventional methods and systems have generally been considered satisfactory for their intended purpose of cold inspection. However, there is still a need in the art for inspection systems and methods.

SUMMARY

In accordance with at least one aspect of this disclosure, a system includes a turbomachine having one or more inspection ports. An LWIR sensor is positioned in the inspection port of the turbomachine to sense thermal energy emitted by a turbomachine component.

An imaging device can be operably connected to the LWIR sensor to convert signals from the LWIR sensor to a thermal image of the turbomachine component based on the sensed thermal energy. In some embodiments, the LWIR sensor is configured to image a ceramic coated turbine blade. It is also contemplated that the LWIR sensor can be configured to image a compressor blade. A determination system can be included that is configured to determine the condition of the coated turbine blade based on a comparison of the thermal image and a thermal template image.

In at least one aspect of this disclosure, a method includes the step of sensing thermal energy of a turbomachine component in a LWIR bandwidth. The method can further include the step of converting the sensed thermal energy into a thermal image. In some embodiments, the method can further include the step of comparing the thermal image to a thermal template image to determine the health of the turbomachine component.

The sensing step can further include sensing a ceramic coated turbine blade and/or can be performed while the turbomachine is activated and hot. The method can further include the step of determining spots of material degradation of a portion of the ceramic coating of the ceramic coated turbine blade.

It is also envisioned that the method can include determining the location and health of cooling channels disposed within the coated turbine blade and/or determining the location and health of cooling holes disposed on the surface of the coated turbine blade. In some embodiments, the method includes determining a condition of a turbomachine component based on the sensed thermal energy.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
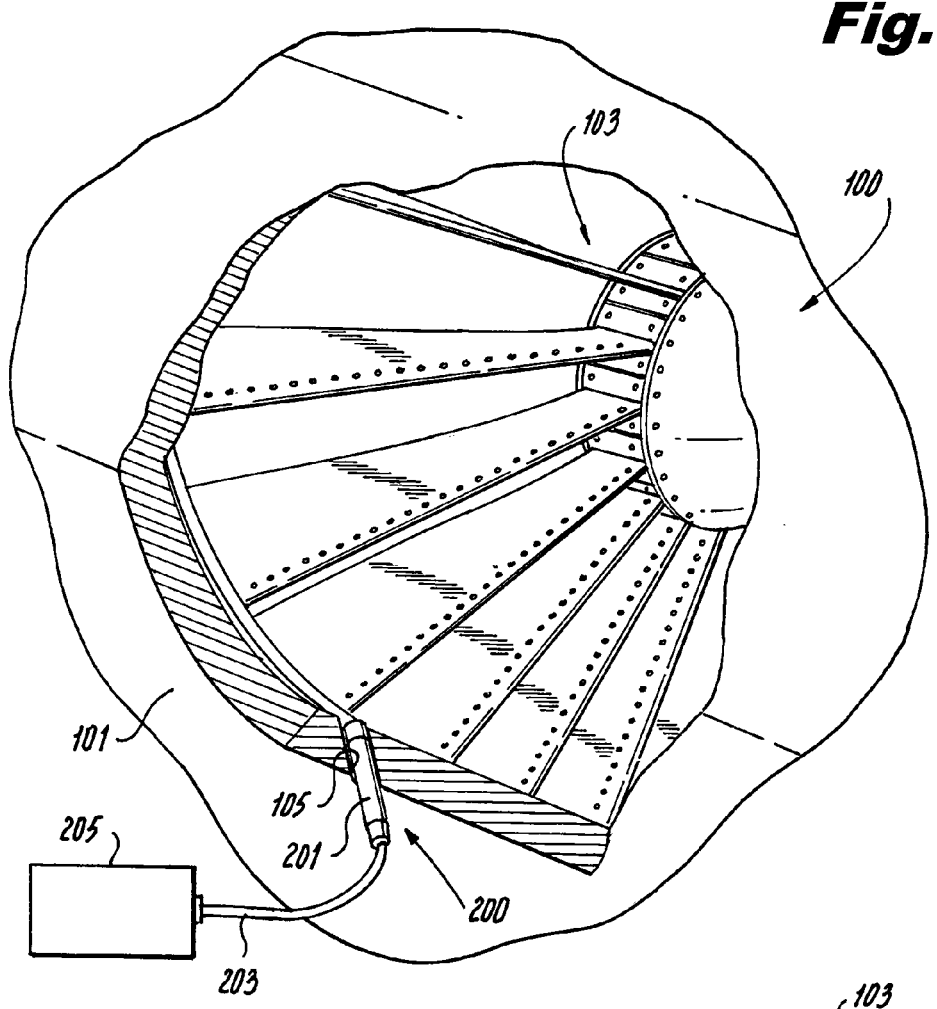
FIG. 1 is a cut-away, perspective view of an embodiment of a turbomachine in accordance with the present disclosure, showing an LWIR sensor disposed therein.

Reference will now be made to the drawings wherein like reference numerals identify similar structural features or aspects of the subject disclosure. For purposes of explanation and illustration, and not limitation, a partial view of an embodiment of a turbomachine in accordance with the disclosure is shown in FIG. 1 and is designated generally by reference character 100. The systems and methods described herein can be used for thermal imaging of turbomachine components.

In accordance with at least one aspect of this disclosure, a system includes a turbomachine 100 having one or more inspection ports 105 disposed in a casing 101. Inspection ports 105 may be of any desired shape, size, or position. In some embodiments, the inspection ports 105 are traditional boroscope ports. A long wave infrared (LWIR) system 200 is operably connected to the turbomachine 100. The LWIR system includes An LWIR sensor 201 that is positioned in the inspection port 105 of the turbomachine 100 to sense thermal energy emitted by a turbomachine component 103, which can be a turbine or compressor rotor for example.

An imaging device 205 can be operably connected to the LWIR sensor 201 via a suitable cable 203 to convert signals from the LWIR sensor 201 to a thermal image of the turbomachine component 103 based on the thermal energy sensed by LWIR sensor 201.

Figure 2:
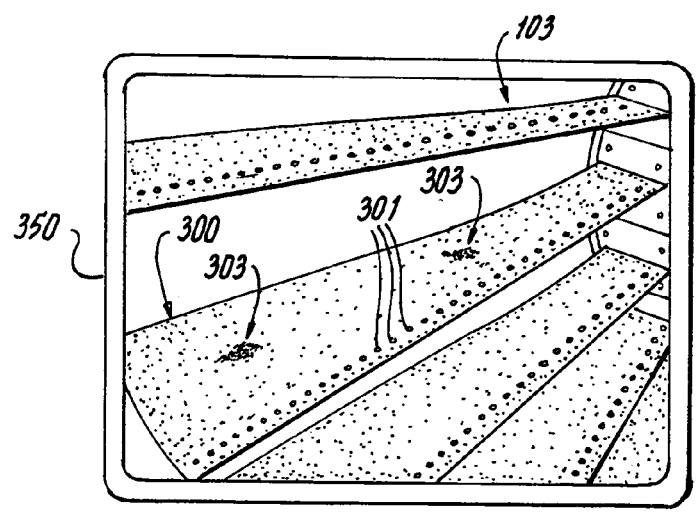
FIG. 2 is a schematic view of an LWIR image of a turbomachine component in accordance with this disclosure, with stippling to indicate defects and cooling channels of a turbine blade in use.

In some embodiments, the LWIR sensor 201 is configured to image a ceramic coated turbine blade 300 as shown in FIG. 2. It is contemplated that an imaging device 205 can resolve the sensed thermal energy from the LWIR sensor 201 to create a digital thermal image to output to a display 350 or other system.

It is also contemplated that the LWIR sensor 201 can be configured to image a compressor blade or any other desired component of the turbomachine 100.

The LWIR system 200 can also include a determination system, e.g. hardware, software, and/or firmware operating in imaging device 205 or remotely, that is configured to determine a condition of the turbomachine component 103 (e.g. the coated turbine blade 300) based on a thermal image comparison of the thermal image that is sensed by the LWIR sensor 201 and/or produced by the imaging device 205 and a thermal template image to compare the differences therebetween. The comparison can be automated and display 350 is therefore optional. In some embodiments, the determination system can receive data from the LWIR sensor 201 and determine, based on localized spots of heating 303, where imperfections or damage to the turbomachine component 103 exist.

The determination system can also be configured to find cooling holes 301 that are formed in turbine blade 300 to determine if each cooling hole 301 is functioning properly or if there is damage/blockage based on comparison of the thermal image with the expected thermal profile. The determination system can also be configured to determine flow rates of the air passing through the cooling holes 301 based on the thermal radiation proximate the cooling holes 301 locations compared to expected thermal radiation for a specific flow rate.

Display 350 can be used for displaying thermal images from the LWIR sensor 201 and/or the imaging device 205 such that the images are visible to a user of the system 200 for visual inspection or comparison of the turbomachine component 103. It is envisioned that display of the images can be still images and/or real-time video. The images may be presented in false color or black and white as desired.

In at least one aspect of this disclosure, a method includes the step of sensing thermal energy of a turbomachine component, e.g. turbomachine component 103, in an LWIR bandwidth. The method can further include the step of converting the sensed thermal energy into a thermal image. In some embodiments, the method can further include the step of comparing the thermal image to a thermal template image to determine the health of the turbomachine component.

This can further include sensing a ceramic coated turbine blade 300 and/or can be performed while the turbomachine 100 is activated and hot. The method can further include the step of determining spots of material degradation of a portion of the ceramic coating of the ceramic coated turbine blade 300, e.g. by detection of surface temperature anomalies.

For example, the method can include determining the location and health of cooling channels disposed within the coated turbine blade 300 and/or determining the location and health of cooling holes 301 disposed on the surface of the coated turbine blade 300 based on the sensed thermal energy. Specifically, an increase in metal temperature due to blocked and/or reduced cooling holes or internal channels will be visible to the LWIR sensor 201. Also if a corrosive product is insulating the cooling channels it would also show up as an increase in external ceramic coating (e.g. TBC) temperature and the LWIR sensor 201 would detect.

Using LWIR sensors in turbomachine applications allows for a much higher resolution for thermal imaging than traditional techniques. Regarding ceramic coated parts, the emissivity of the ceramics requires no correction in the sensed signals since the emissivity of such parts approaches black body emissivity. Accordingly, very high spatial resolution real time images can be taken of a turbomachine in full operation, allowing mechanics and engineers to easily determine the actual health of components of a running turbomachine. Using an LWIR system as described herein on a ceramic coated part (e.g. turbine blade 300) allows for an order of magnitude better resolution than the known systems and methods. With such high resolution images, fine defects and other components (cooling holes 301) can be imaged and inspected while the turbomachine 100 is in operation, allowing for a much more accurate understanding of component health and efficiency.

The methods and systems of the present disclosure, as described above and shown in the drawings, provide for thermal imaging of turbomachine components with superior properties including high resolution and enhanced clarity as well as the ability to observe turbomachine components during operation. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A system, comprising:
a turbomachine including a casing that encases at least one turbomachine component, and at least one inspection port formed integrally in the casing; and
an LWIR sensor positioned in the at least one inspection port of the turbomachine to sense thermal energy emitted by the at least one turbomachine component,
wherein the at least one turbomachine component includes at least one blade including a surface having opposing edges that extend along a length of the turbomachine to define a blade length, the at least one blade including a plurality of cooling holes formed along at least one of the edges, and
wherein the at least one inspection port is positioned so as to define a field of view exposing the blade length of the at least one blade, the LWIR sensor positioned at an angle determined by the at least one inspection port to capture the plurality of cooling holes.

2. The system of claim 1, further comprising an imaging device operably connected to the LWIR sensor to convert signals from the LWIR sensor to a thermal image of the at least one turbomachine component based on the sensed thermal energy.

3. The system of claim 2, wherein the LWIR sensor is configured to image a compressor blade of the turbomachine.

4. The system of claim 1, wherein the LWIR sensor is configured to image a ceramic coated turbine blade of the turbomachine.

5. The system of claim 4, further comprising a determination system that is configured to determine a condition of the coated turbine blade based on a thermal image comparison of the thermal image and a thermal template image.

6. A method, comprising:
encasing at least one turbomachine component in a casing of a turbomachine, the turbomachine component including a blade, the blade including a surface having opposing edges that extend along a length of the turbomachine to define a blade length, and including a plurality of cooling holes formed along at least one of the edges;
integrally forming at least one inspection port in the casing, the at least one inspection port being positioned so as to define a field of view exposing the opposing edges of the blade; and
disposing an LWIR sensor in the at least one inspection port of the turbomachine to sense thermal energy emitted by the at least one turbomachine component,
wherein disposing the LWIR sensor in the at least one inspection port positions the LWIR sensor at an angle to capture the plurality of cooling holes.

7. The method of claim 6, further comprising determining a condition of the at least one turbomachine component based on the sensed thermal energy.

8. The system of claim 1, wherein disposing the LWIR sensor in the at least one inspection port positions the LWIR sensor at an angle to capture an entirety of the at least one edge.

9. The method of claim 6, further comprising converting the sensed thermal energy into a thermal image.

10. The method of claim 9, further comprising comparing the thermal image to a thermal template image to determine the health of the at least one turbomachine component.

11. The method of claim 10, wherein the operation of sensing thermal energy further includes sensing a ceramic coated turbine blade.

12. The method of claim 11, wherein the sensing step is performed while the turbomachine is activated and hot.

13. The method of claim 12, further comprising determining spots of material degradation of a portion of the ceramic coating of the ceramic coated turbine blade.

14. The method of claim 13, further comprising determining the location and health of cooling channels disposed within the coated turbine blade.

15. The method of claim 13, further comprising determining the location and health of the cooling holes disposed on the surface of the coated turbine blade.

* * * * *